United States Patent Office 2,696,389
Patented Dec. 7, 1954

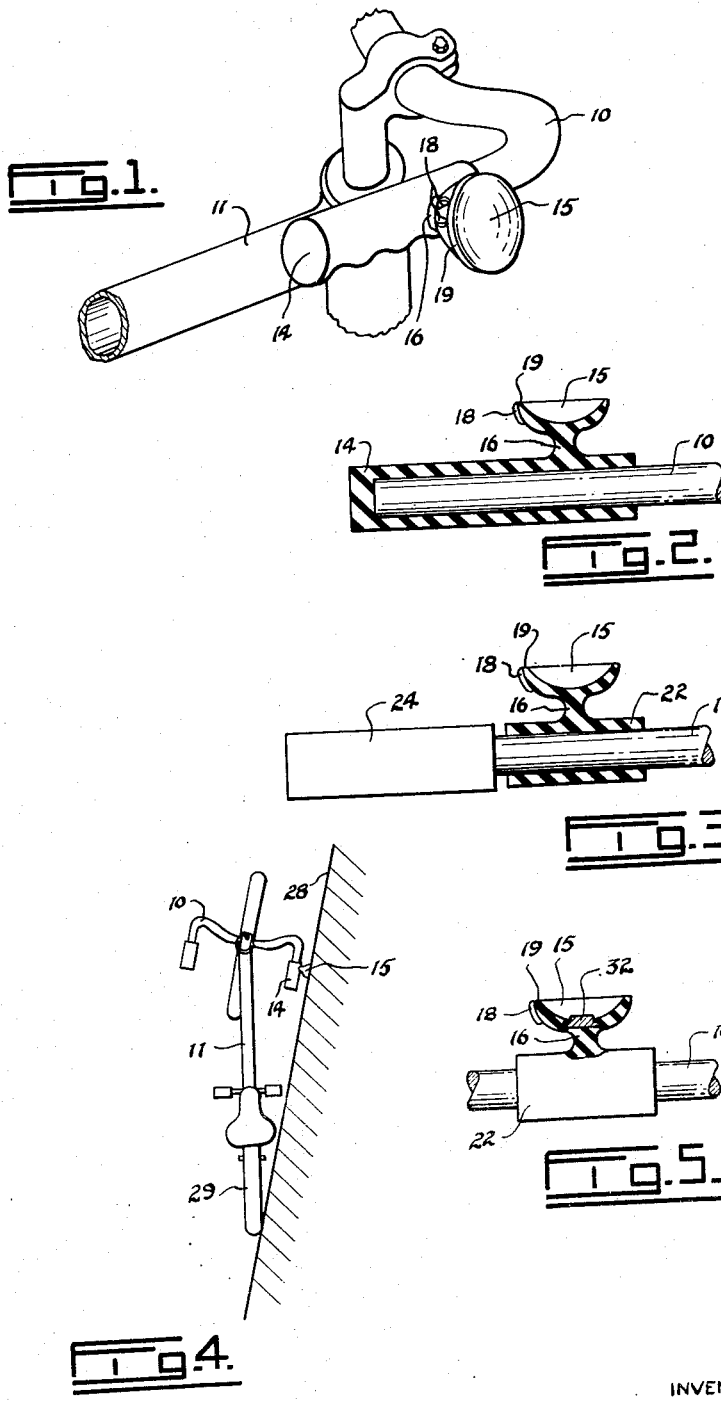

2,696,389
BICYCLE SUPPORTING DEVICE

William Wallace Cessford, Vancouver, British Columbia, Canada

Application December 12, 1949, Serial No. 132,590

Claims priority, application Canada July 14, 1949

3 Claims. (Cl. 280—293)

This invention relates to a device for supporting bicycles.

An object of the present invention is the provision of an extremely simple device for supporting a bicycle when it is placed against a substantially flat surface in order to keep it from falling down.

Another object is the provision of a device for holding up a bicycle leaned against a wall or the like which may be quickly and easily put into operation.

At present there are stands for holding bicycles upright when not in use, but these are rather heavy and cumbersome and require a little time to set them up. Consequently, bicycles are usually leaned against a wall or post. When this is done, vibration often causes the front wheel to turn a little and this results in the bicycle sliding to the ground.

The present bicycle supporting device is very simple and it does not require any extra effort or time to put it into operation when the bicycle is leaned against an object, such as a wall or post. The device consists of a tube adapted to fit onto the handle-bar of a bicycle, and a resilient suction cup secured to the tube and facing outwardly laterally therefrom. When the bicycle is leaned against a flat surface in a substantially upright position, the cup is pressed against the surface, to which it adheres and supports the bicycle in the vertical position.

Examples of this invention are illustrated in the accompanying drawings, in which, Figure 1 is a perspective view showing the handle-bars of the bicycle with one form of the invention mounted thereon.

Figure 2 is a horizontal section through the supporting device shown in Figure 1, Figure 3 is a horizontal section through an alternative form of the invention, and Figure 4 is a plan view diagrammatically illustrating a bicycle being held in position by the supporting device.

Figure 5 is a horizontal section through an alternative form utilizing a magnet.

Referring to Figures 1 and 2, 10 represents the handle-bar of a bicycle 11. The supporting device consists of a tubular handle grip 14 adapted to fit on the handle-bar in the usual manner. A resilient suction cup 15 is secured to the handle grip by means of a flexible neck 16. The handle grip, suction cup, and neck may be formed of rubber or rubber composition, in which case they may be moulded in a single piece, as shown.

If desired, a pair of spaced lugs 18 may be secured to or formed on the outer surface of the cup 15 adjacent the rim 19 thereof.

In the alternative of Figure 3, a tube 22 is used in place of the handle grip. The suction cup 15 is mounted substantially laterally therefrom in the manner described in connection with Figures 1 and 2. The lugs 18 may also be used. The tube 22 is adapted to fit onto the handle-bar 10 just ahead of an ordinary handle grip 24.

When the supporting device is mounted on the handle-bar of the bicycle, the resilient cup 15 projects outwardly to one side of the bicycle. The bicycle may now be leaned against a flat surface, such as a wall, or pane of glass. It is only necessary to press the cup against the surface. The suction holds the bicycle in a substantially vertical position. In order to release it, it is only necessary to give the bicycle a sudden pull away from the surface. If the lugs 18 are employed, this is not necessary since they may be squeezed together to distort the rim 19 of the cup therebetween to admit air between the cup and the flat surface. The flexible neck 16 allows the cup to turn in relation to the handle-bar so that the cup may be pressed against the flat surface regardless of the angle of the bicycle to said surface, within reason.

Figure 4 diagrammatically illustrates the bicycle 11 leaning against a wall 28. When the back wheel 29 of a bicycle is leaned against the wall, and the suction cup 15 is pressed against the wall, as shown, there is no danger of the bicycle falling down unless it is pulled away from the wall or subjected to a blow of some kind.

The supporting device is put into operation merely by leaning the bicycle and the suction cup against the surface. No extra time or effort is required. The supporting device is very light and does not materially add to the weight of the bicycle and it does not interfere with its normal use or operation.

Figure 5 illustrates an alternative in which a strong magnet 32 is imbedded in the bottom of the cup 15. This magnet will help to retain the bicycle in a vertical position when the cup is pressed against a metal object.

What I claim as my invention is:

1. A device for supporting a bicycle against a surface and for preventing the front wheel thereof from turning laterally while the bicycle is being supported, comprising a tube to be fitted onto the handle bar of a bicycle and a suction cup extending fore and aft of the latter, and a suction cup secured to the tube near the forward end thereof and opening outwardly laterally at right angles to its side, the portion of the tube behind the cup forming a hand grip, whereby the bicycle may be supported in a substantially vertical position by pressing the suction cup against a vertical surface to one side of the bicycle.

2. A device for supporting a bicycle against a surface and for preventing the front wheel thereof from turning laterally while the bicycle is being supported, comprising a tube to be fitted on the handle bar of a bicycle and extending fore and aft of the latter, a suction cup, and a thin flexible neck connecting the cup to the tube near the forward end thereof and opening outwardly laterally at right angles to its side, the portion of the tube behind the cup forming hand grip, whereby the bicycle may be supported in a substantially vertical position by pressing the suction cup against a vertical surface to one side of the bicycle.

3. A device for supporting a bicycle against a surface and for preventing the front wheel thereof from turning laterally while the bicycle is being supported, comprising a tube to be fitted on the handle bar of a bicycle and extending fore and aft of the latter, a suction cup, a thin flexible neck connecting the cup to the tube near the forward end thereof and opening outwardly laterally at right angles to its side, the portion of the tube behind the cup forming a hand grip, and a flat permanent magnet embedded in the bottom of the cup having a face exposed within the latter, whereby the bicycle may be supported in a substantially vertical position by pressing the suction cup against a vertical surface to one side of the bicycle.

References Cited in the file of this patent

UNITED STATES PATENTS

| Number | Name | Date |
|---|---|---|
| 1,598,559 | Cohen | Aug. 31, 1926 |
| 1,641,880 | Cohen | Sept. 6, 1927 |
| 1,743,442 | Fanslaw et al. | Jan. 14, 1930 |
| 1,743,694 | Tierney | Jan. 14, 1930 |
| 1,899,242 | McNab | Feb. 28, 1933 |
| 2,231,230 | Sturtz | Feb. 11, 1941 |
| 2,302,300 | Davies | Nov. 17, 1942 |

FOREIGN PATENTS

| Number | Country | Date |
|---|---|---|
| 1,919 | Great Britain | Jan. 26, 1895 |
| 403,895 | Great Britain | Jan. 4, 1934 |
| 758,427 | France | Nov. 3, 1933 |